INVENTORS.
Merwin W. Gilmore
Jerald W. Bishop
BY John A. Hamilton
Attorney.

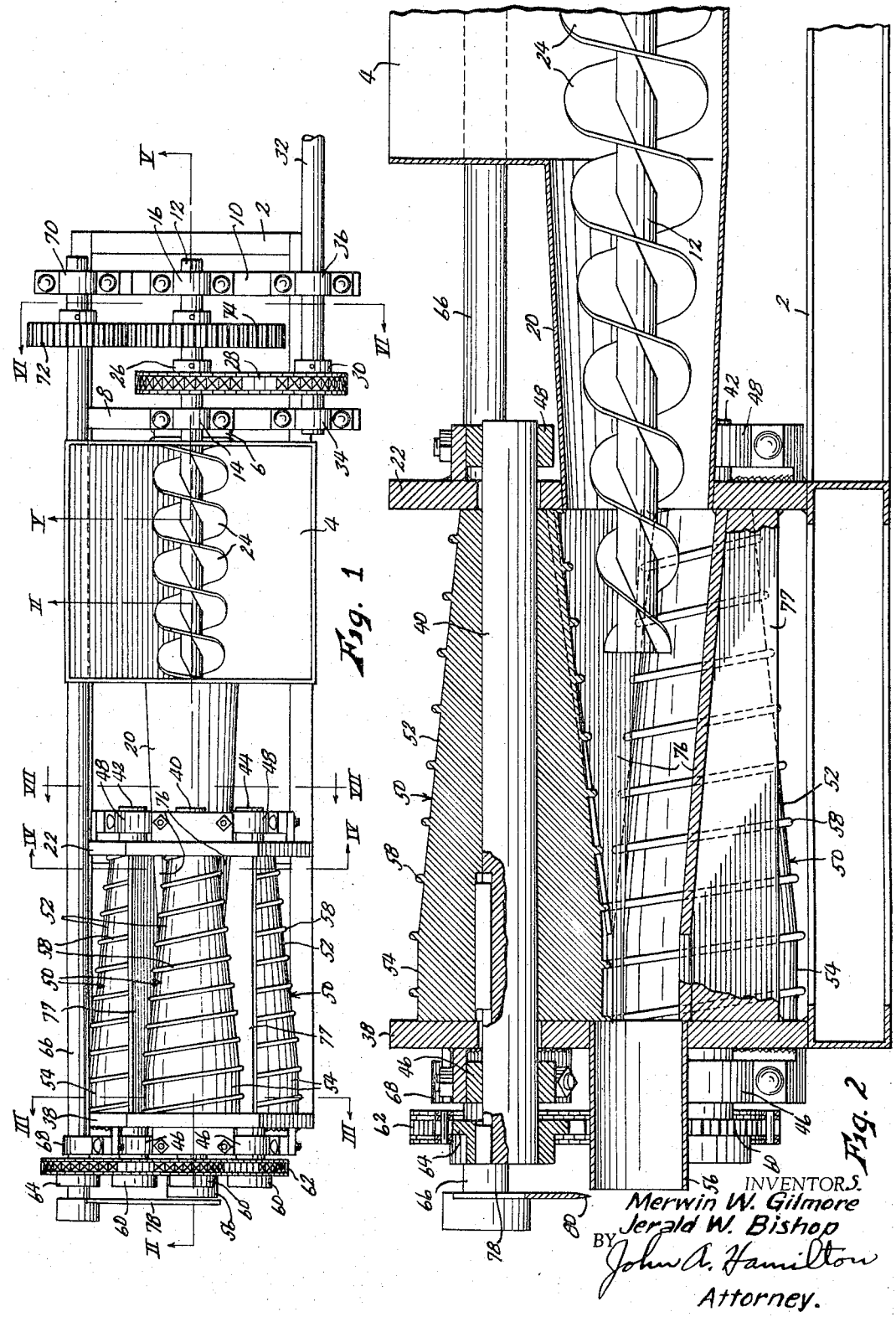

INVENTORS.
Merwin W. Gilmore
Jerald W. Bishop
BY John A. Hamilton
Attorney.

United States Patent Office 3,353,479
Patented Nov. 21, 1967

3,353,479
HAY PELLETING DEVICE
Merwin W. Gilmore and Jerald W. Bishop, Clay Center, Kans., assignors to Gilmore-Tatge Manufacturing Co., Inc., Clay Center, Kans., a corporation of Kansas
Filed May 13, 1964, Ser. No. 367,037
11 Claims. (Cl. 100—86)

This invention relates to new and useful improvements in devices for preparing hay for consumption by livestock, and has particular reference to a device for reducing loose hay to a tightly compacted pellet form. The advantages of pelleting in the reduction of storage space required, ease and convenience of handling and feeding, and better preservation of the nutrient values of the hay, as well as other advantages, are well known and do not require elaboration or detailed discussion.

The principal object of the present invention is the provision of a device which will reduce loose hay to tightly compacted, neat pellets which will retain their shape indefinitely without necessity of any binding or fastening of any kind. Generally, the device accomplishes this function by forming the hay into a generally cylindrical column and applying a radially compressive force thereto, while at the same time applying a twisting force and a longitudinally compressive force thereto. A cutter may be provided for severing the compacted column of hay into short lengths to form pellets.

Another object is the provision of a hay pelleting device of the character described wherein the column of hay is automatically severed into short lengths during the forming process, without necessity of knives, shears, or any other cutters.

Other objects are simplicity and economy of construction, efficiency and dependability of operation, and adaptability for use with a wide variety of types of hay and other materials.

Figure 3:
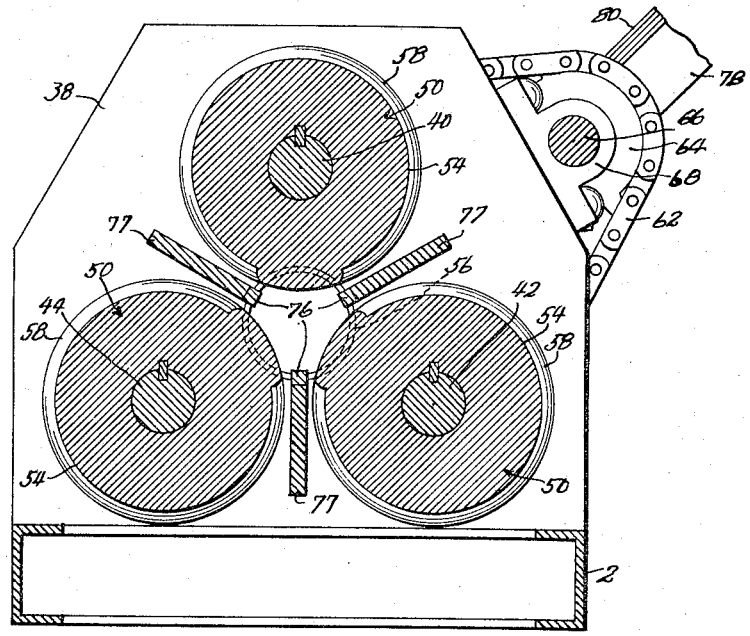
Figure 4:
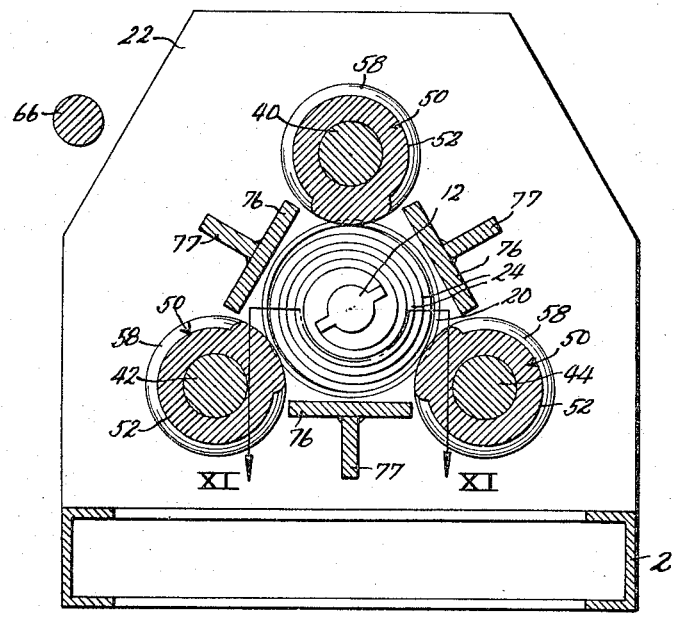
Figure 5:
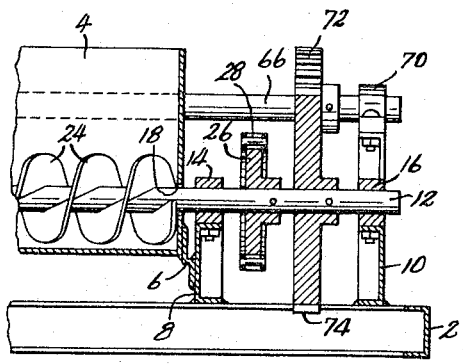
Figure 6:
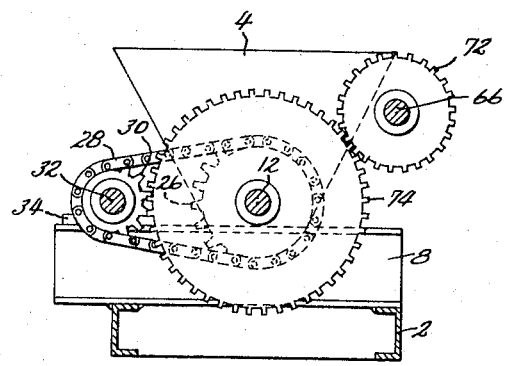
Figure 7:
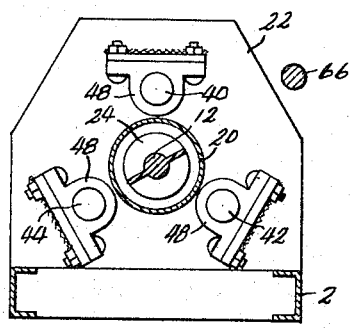
Figure 8:
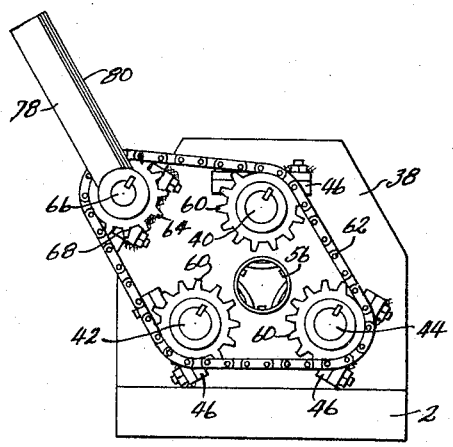
Figure 9:
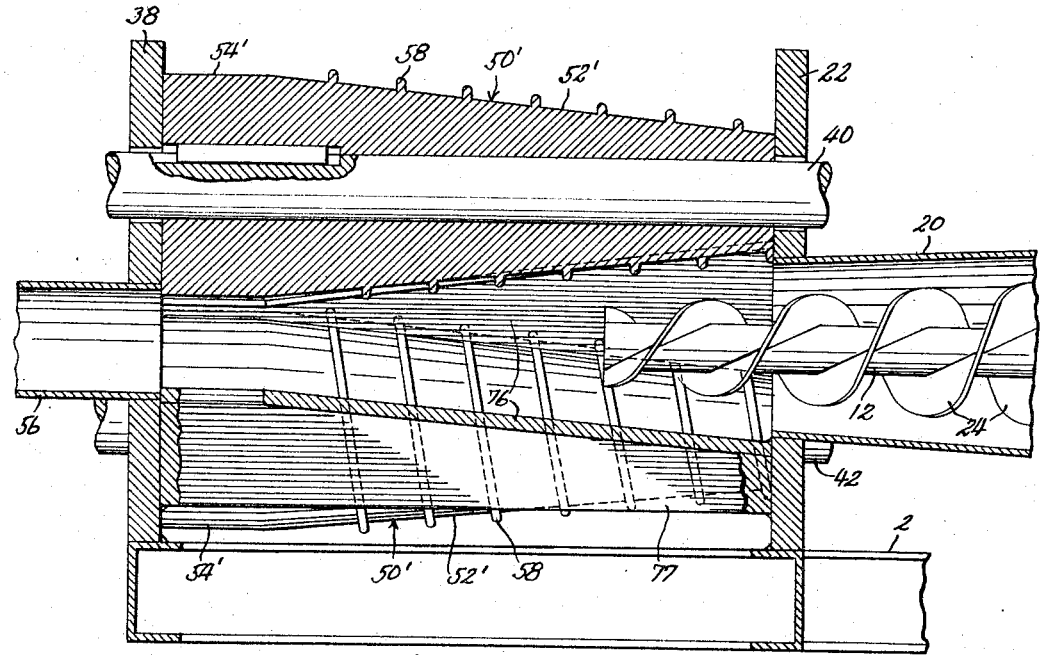
Figure 10:
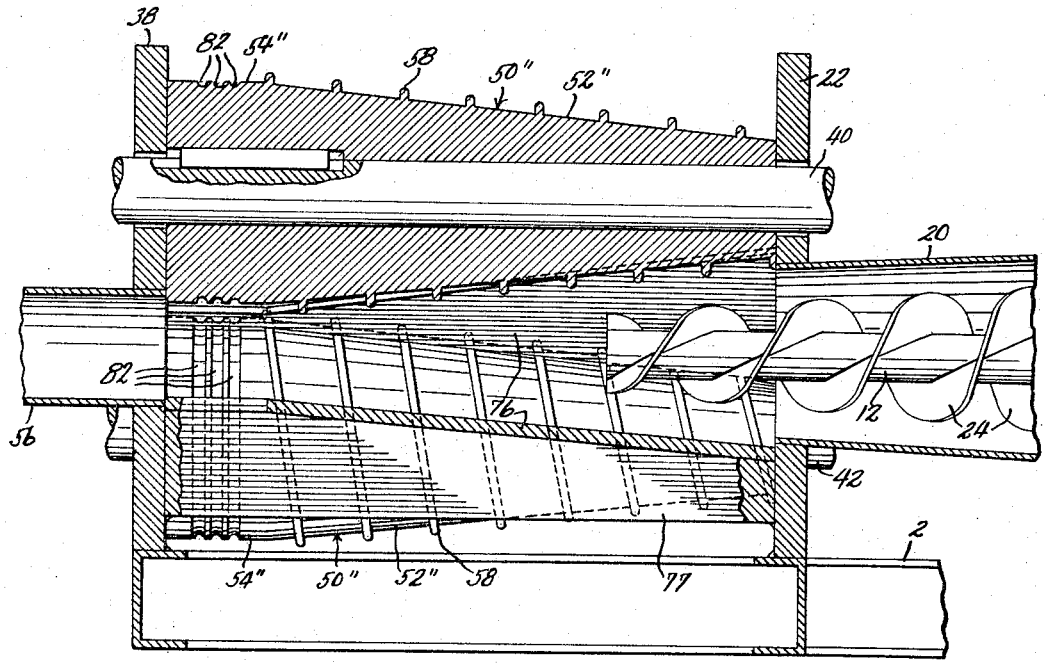
Figure 11:
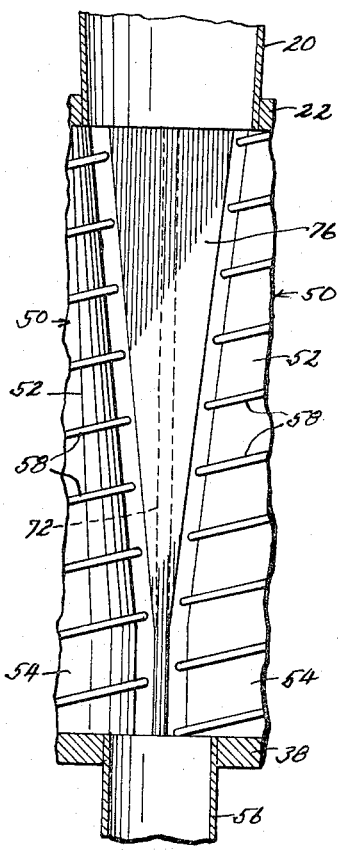

With these objects in view, as well as other objects which will appear in the course of the specification, reference will be had to the accompanying drawing, wherein:

FIG. 1 is a top plan view of a hay pelleting device embodying the present invention, FIG. 2 is an enlarged fragmentary sectional view taken on line II—II of FIG. 1, with parts left in elevation and partially broken away, FIG. 3 is an enlarged fragmentary sectional view taken on line III—III of FIG. 1, FIG. 4 is an enlarged sectional view taken on line IV—IV of FIG. 1, FIG. 5 is a fragmentary sectional view taken on line V—V of FIG. 1, FIG. 6 is a sectional view taken on line VI—VI of FIG. 1, FIG. 7 is a sectional view taken on line VII—VII of FIG. 1, FIG. 8 is an elevational view of the left end of the apparatus as shown in FIG. 1, FIG. 9 is a fragmentary view similar to FIG. 2, with parts omitted, showing a slightly modified form of construction, FIG. 10 is a view similar to FIG. 9, showing another modification of structure, and FIG. 11 is a fragmentary sectional view taken on line XI—XI of FIG. 4.

Like reference numerals apply to similar parts throughout the several views, and the numeral 2 applies generally to a horizontal base formed of channel iron bars rigidly secured together and being of elongated rectangular form. Adjacent the right end of said base, as viewed in FIG. 1, is a hopper 4 for receiving loose hay, said hopper being affixed by bracket 6 to a channel iron cross bar 8 extending transversely across base 2 and being affixed thereto. A second cross bar 10 is affixed to the base in parallel, spaced apart relation to cross bar 8, substantially at the right end of the base. A horizontal auger shaft 12 extending longitudinally above base 2 is journalled rotatably in bearings 14 and 16 affixed respectively to cross bars 8 and 10, and extends through a hole 18 (see FIG. 5) in the left end wall of hopper 4, through said hopper, through a taperingly reduced delivery tube 20 extending to the left from said hopper, and outwardly from the left end of said hopper. Delivery tube 20, which is coaxial with the auger shaft, has its larger end secured in the left end wall of hopper 4, and opens into said hopper, and has its smaller end secured in a vertical plate 22 affixed to and extending upwardly from base 2, said plate being disposed transversely of the base, said delivery tube opening through said plate.

As shown, auger shaft 12 is provided with double flights 24 of a substantially large lead extending through the hopper and to the free end of said shaft, and being tapered to correspond generally with the taper of delivery tube 20. Said flights are left-handed, and shaft 12 is adapted to be rotated in a clockwise direction looking toward the free end thereof, whereby hay deposited in hopper 4 will be conveyed from said hopper through tube 20. Shaft 12 is driven by means of a sprocket 26 fixed thereon intermediate bearings 14 and 16, said sprocket being operatively connected by means of chain 28 with a sprocket 30 fixed on a drive shaft 32 parallel to shaft 12, shaft 32 being mounted rotatably in bearings 34 and 36 mounted on cross bars 8 and 10, and being turned by any suitable power unit, not shown.

Affixed to the extreme left end of base 2 is an upwardly extending plate 38 which is parallel to but spaced apart from plate 22. Extending between said plates are three parallel shafts 40, 42 and 44, said shafts being parallel to auger shaft 12, but being angularly and equally spaced apart about the axis of said auger shaft. Shafts 40, 42 and 44 extend through loosely fitting holes provided therefor in plates 22 and 38, and each is journalled in a pair of bearings 46 and 48 mounted respectively on the distal faces of said plates. A drum 50 is fixed coaxially on each of shafts 40, 42 and 44. Each of said drums extends the full distance between plates 22 and 38, and has a conical section 52 with its smaller end engaging plate 22 and being taperingly enlarged toward plate 38, and a cylindrical section 54 merging with the larger end of the conical section and engaging plate 38. A discharge tube 56 is fixed in plate 38 so as to be coaxial with auger shaft 12, opening through said plate and extending outwardly therefrom. The diameter of said discharge tube is slightly greater than the diameter of a circle circumscribed by the cylindrical portions 54 of drums 50 and concentric with the auger shaft. The diameter of delivery tube 20, where it opens through plate 22, is slightly less than the diameter of a circle circumscribed by the smallest portions of conical sections 52 of drums 50, and concentric with the auger shaft. Each of drums 50 is provided with a raised helical rib or flight 58 of uniform radial extension either integral with or rigidly affixed thereto, said rib having a right-hand twist and having a substantially smaller lead than the auger flights 24. Ribs 58 are smooth and rounded.

As will presently appear, drums 50 rotate in a direction opposite to the rotation of the auger with its left-hand flights, so as to advance the column of hay fed therebetween by the auger in the same direction. However, the drums rotate at a greater speed than the auger but advance the column of hay at a speed less than the rate of feed of the auger, for purposes which will presently be described. Each of shafts 40, 42 and 44 is extended outwardly from plate 38, and has a sprocket 60 affixed on the extended portion thereof. A sprocket chain 62 is trained about all of sprockets 60, and about a sprocket 64 fixed on a drive shaft 66 which extends substantially the full length of base 2 parallel to the axis of the device. Said shaft is journalled adjacent one end in a bearing 68 mounted on plate 38, and is journalled at its opposite end in a bearing 70 mounted on cross bar 10. A smaller gear 72 fixed on shaft 66 is meshed with a larger gear 74 fixed on auger shaft 12. Thus whenever the auger shaft 12 is turned by drive shaft 32 as previously described, drive shaft 66 and drums 50 will be caused to rotate in the opposite direction, but at a higher speed of rotation due to the ratio of gears 72–74. In the species of the invention shown in FIGS. 1–8, the helical rib 58 of each drum 50 extends the full length of said drum, including both the conical and cylindrical sections thereof.

The spaces between contiguous pairs of drums 50 are substantially filled by long generally triangular guide plates 76 extending between and welded to plates 22 and 38. At the ends thereof secured to plate 22, said plates circumscribe a circle concentric with auger shaft 12 and of slightly larger diameter than that of the discharge end of auger tube 20, and their confronting faces are tangent to said circle. Said plates 76 converge toward plate 38, until, at the juncture between conical section 54 of the drums, they circumscribe a circle concentric with the auger and of slightly smaller diameter than that of discharge tube 56. From that point to plate 38, plates 76 are not triangular but of uniform width, and extend parallel to the auger axis whereby to define a cylinder coaxial with said auger axis. Each plate 76 is reinforced by a web 77 disposed therebehind and extending the full length thereof, said web being welded to said plate, and to plates 22 and 38.

Affixed to the extended end of drive shaft 66, adjacent sprocket 64, is a radially extending blade 78 having a sharpened edge 80. Said blade is so positioned that on each revolution of shaft 66 it traverses the exit end of discharge tube 56 to sever the column of hay issuing therefrom.

In operation, loose hay is fed into hopper 4 and is urged by auger flights 24 through tube 20, being radially compressed or condensed to some extent during this time by the conical form of said tube, and discharged thereby into the generally conical chamber defined by drums 50 and guide plates 76. With material as coarse and fibrous as hay, it is not necessary that the auger flights fit snugly in the auger tube. The fact that both drums 50 and plates 76 circumscribe a circle of slightly larger diameter than the discharge end of the auger tube prevents hay from being snagged or caught thereby as it emerges from the auger tube.

The column of hay is then engaged by the helical ribs 58 of drums 50 and is urged forwardly thereby through the chamber defined by the drums, whereby it is still further radially compressed. Guide plates 76 prevent the escape of hay laterally between the drums, and also assist in the compression thereof. The forward driving force of ribs 58 is necessary to force the column of hay forwardly between the drums, but it will be noted that the forward speed which tends to be imparted to the hay by the ribs is less than the speed at which the hay is fed between the drums by auger flights 24, whereby the column of hay is longitudinally compressed to provide still greater compaction. This is true since while drums 50 rotate at a greater speed than auger 24, for reasons presently to be described, the lead of the drum ribs 58 is in still greater proportion less than the lead of auger 24. As shown, the drums rotate at about twice the speed of the auger, due to the ratio of gears 72–74, but the lead of ribs 58 is only about one-third of the lead of the auger, whereby the longitudinal length of the column of hay is reduced by about one-third as it traverses the length of the drums. These proportions have been proven effective with many types of hay but obviously could be altered if desired within the scope of the invention. Due to the shortening of the column of hay as described, there must of course be a longitudinal slippage of ribs 58 along the column of hay. The smooth and rounded contour of the ribs prevents any substantial snagging or tearing of the hay thereby as a result of this slippage.

At the same time that the column of hay is being radially and longitudinally compressed between the drums as just described, it will be seen that the drums are tending to rotate or twist the column of hay in a clockwise direction looking forwardly, due to the sliding frictional drag of said drums on said hay. This causes a tight twisting of the hay column which, in combination with the radial and longitudinal compression heretofore described, has been found to produce a tight, well-bonded column of hay which remains tightly knit after it emerges from the device, and which will not disintegrate even after substantial moving and handling.

It has been found that the rotational speed of the drums must be substantially greater than that of auger 24, in order to apply a desirably great degree of torque to the column of hay, since the drums and their ribs must be smooth to avoid tearing of the hay, and hence have a rather high degree of rotational slippage against the hay. In other words, the drums must have a high peripheral speed as compared to the rate of speed at which hay is fed therebetween by the auger. Since the actual criterion is the peripheral speed of the drums, not revolutions per minute, said high peripheral speed could theoretically be obtained by increasing the diameter of the drums rather than their r.p.m. However, the diameter of the drums is effectively limited by the necessity of producing a conical chamber of specified size therebetween. The present device provides a thoroughly practical solution to the problem by increasing the r.p.m. of the drums to provide the necessary high peripheral speed thereof for twisting of the hay, and reducing the lead of the drum ribs, as compared to that of the auger flights, to a still greater degree to provide for longitudinal compression of the hay column as previously described. This relationship is a very important feature of our invention.

After the column of hay has traversed the entire length of the conical sections 52 of drums 50, it enters between and traverses the cylindrical sections 54 of said drums. This may be termed the "dressing" section of said drums, in that since as the hay traverses it no further radial compression occurs and hence no great disturbance of the strands of hay, any projecting loose ends of hay strands tend to be rolled into the column to provide a neater, smoother surface. The hay column then enters and passes through discharge tube 56. The fact that the drums and guide plates 76 circumscribe a circle smaller than the diameter of the discharge tube, at the entrance to said tube, prevents the hay from being snagged or caught by the edge of the tube. Also, the tube must be larger than the hay column, since otherwise the resilient expansive tendency of the hay would cause the column of hay to bind and stick in the tube.

As the hay column emerges from discharge tube 56, it is severed into short lengths to form pellets by the action of cutter blade 78. While a highly simplified cutter is shown, it will be apparent that other types of cutters could be utilized within the spirit of the invention, and that they could be adjustable to cut the hay column into pellets of different lengths as desired. As shown, the cutter will form approximately "square" pellets, that is, each pellet will have a length approximately equal to its diameter, but this is by way of example only.

While it may be preferred in perhaps a majority of applications to equip the device with a cutter blade 78, or an adjustable cutter, in order that the pellets may be formed accurately in any desired length, it is possible by means of slight modifications of structure to provide that the column of hay will be automatically severed by twisting into reasonably uniform lengths during the forming process, without the necessity of cutter blades or mechanisms of any sort. This type of operation has advantages of simplicity and economy, and therefore may be desired in some cases even though as will appear it does not offer a means for varying the length of the pellets formed. Such operation can be obtained by modifications of structure shown in FIGS. 9 and 10.

In FIG. 9, in which many parts are omitted for convenience and clarity, it will be understood that the structure is the same as that shown in FIGS. 1–8 except that cutter 78 is omitted, and except that helical rib 58 of each drum terminates at a point on conical portion 52' of the drum spaced apart from the cylindrical portion 54' of said drum. Since the hay column is advanced between the drums by the action of ribs 58, it will be seen that as the advancing forward end of the hay column passes the ends of said ribs and engages the unribbed portions of the conical drum sections, the resistance to further forward movement is greatly increased, in that it no longer has the assistance of the ribs. As a result, the longitudinal compressive force in the column increases still further, tending to expand the column radially against drums 50', and the twisting torque applied to the column by rotation of the drums also increases, and continues to increase until the column of hay is unable to support the torque load and is severed by twisting free of the portion of the hay column still engaged by auger 24. The stress will tend to be concentrated and the severance will occur at the weakest point in the column of hay, most commonly directly at the free end of the auger, since before that point it is internally reinforced by the auger itself, and since the stress in the portion of the column outwardly from the auger tends to be distributed evenly throughout a substantial length of the column. The pellet thus formed will therefore have a maximum length equal to the axial distance between the end of the auger and a point on the unribbed portion of the conical sections of the drums. The exact length may vary somewhat due to variation in the distance the column must be forced onto the unribbed sections of the drums before a shearing torque is built up, and due to the fact that if the hay strands happen to be irregularly arranged so as to form natural "cleavage" planes in the column, severance may occur outwardly from the end of the auger. However, the pellets are of sufficiently uniform length to be entirely satisfactory for many purposes. Once the severance has occurred, the pellet formed by the severed end portion of the column is relatively free to be rotated bodily by the action of the drums, and therefore is capable of being pushed on through the drums by the portion of the hay column still directly engaged by the auger, even though said pellet must be still further compressed as it completes its travel between the conical sections of the drums. This process is repeated continually, the hay column emerging from the exit end of discharge tube in the form of pellets without need of a cutter. Actually, pellets could be formed in this manner even if ribs 58 continued the full length of the drums except for the cylindrical portions thereof, at least if said cylindrical portions were lengthened somewhat, since even said cylindrical sections resist forward movement of the hay column quite strongly when not ribbed. However, termination of the ribs on the conical drum sections provides a more rapid build-up of resistance in a short travel of the column, and hence tends to produce pellets of more uniform length.

Another means for creating resistance to travel of the hay to provide the shearing torque described above is shown in FIG. 10. In that structure, which is otherwise the same as that shown in FIG. 9, the helical rib 58 of each drum 50" is continued to the juncture of the conical and cylindrical portions 52" and 54" thereof, and a series of peripheral grooves 82 are formed in the cylindrical section 54" of each drum. In this species of the invention, resistance to the travel of the column of hay, in addition to the resistance caused by the fact that the cylindrical sections of the drums are unribbed, is supplied by the grooves, 82, in that the column of hay tends to expand into the grooves, and therefore must again be compressed to traverse said grooves. The width and number of said grooves may of course be changed as desired, although the grooves as shown have been found entirely adequate to brake the travel of the hay sufficiently to cause torsional severance of the hay at the end of the auger as in the FIG. 9 species.

While we have shown and described specific embodiments of our invention, it will be readily apparent that many minor changes of structure and operation could be made without departing from the spirit of the invention as defined by the scope of the appended claims.

What we claim as new and desire to protect by Letters Patent is:

1. In a hay pelleting device:
   (a) a base,
   (b) a series of conically tapered drums carried by said base each for axial rotation, said drums being parallel, coextensive, and angularly spaced apart whereby they define in skeleton form a conically tapered chamber therebetween, each of said drums being provided with a raised helical rib at the surface thereof, said rib being of generally uniform pitch,
   (c) means for rotating said drums at equal speeds in the same direction whereby said ribs tend to advance hay introduced into the larger end of said conical chamber toward the smaller end of said chamber, whereby said hay is radially compressed and twisted about the axis of said chamber, and
   (d) means for introducing hay into the larger end of said conical chamber.

2. A device as recited in claim 1 with the addition of means regulating the relative rates of operation of said drum rotating means and said hay introducing means whereby hay is introduced into said chamber by said hay introducing means at a greater lineal rate of speed, parallel to the axis of said chamber, than said hay is advanced between said drums by the ribs thereof, whereby the hay within said chamber is compressed in a direction parallel to the axis of said chamber.

3. A device as recited in claim 1 wherein said means for delivering hay to said conical chamber comprises:
   (a) a hopper carried by said base in spaced relation from said drums,
   (b) an auger tube extending between said hopper and said chamber, being coaxial with said chamber and being taperingly reduced in diameter toward said chamber,
   (c) an auger extending from said hopper into the larger end portion of said chamber through said auger tube, and
   (d) means for rotating said auger whereby hay is delivered from said hopper through said auger tube into said chamber.

4. A device as recited in claim 3 with the addition of means regulating the relative rates of rotation of said drums and said auger whereby said drums are rotated in a given proportion faster than said auger, but wherein the lead of said auger is in still greater proportion greater than the lead of the ribs of said drums, whereby hay tends to be advanced by said auger at a greater lineal rate than said hay tends to be advanced by said ribs.

5. A device as recited in claim 4 wherein the twist of said auger is opposite to the twist of the ribs of said drums, and wherein said drums are rotated oppositely to the direction of rotation of said auger.

6. A device as recited in claim 3 wherein the helical rib of each of said drums terminates in spaced apart relation from the larger end of said drum, whereby the additional resistance to movement of hay longitudinally of the drums caused by termination of said ribs results in greater compression and greater rotational torque on the hay, thereby causing severance of the column of hay by twisting at the end of the auger.

7. A device as recited in claim 3 wherein each of said drums is provided with a cylindrical section coaxial with and merging with the larger end of the conical section thereof, whereby a cylindrical chamber is defined in skeleton form between said cylindrical drum sections, and wherein the helical rib of each drum terminates substantially at the juncture between the conical and cylindrical sections thereof, the cylindrical section of each drum having one or more peripheral grooves formed in the surface thereof.

8. A device as recited in claim 1 with the addition of:
(a) a generally triangular guide plate disposed fixedly between each contiguous pair of said drums and extending the full length thereof, the confronting faces of said guide plates being generally tangentially disposed to said conical chamber and further completing the enclosure of said chamber.

9. A device as recited in claim 1 wherein each of said drums is provided with a cylindrical section coaxial with and merging with the larger end of the conical section thereof, whereby a cylindrical chamber is defined in skeleton form between said cylindrical drum sections.

10. A device as recited in claim 1 with the addition of:
(a) cutter means operable to sever the column of hay issuing from the smaller end of said chamber into short lengths to form pellets.

11. A device as recited in claim 10 wherein said cutter means is interconnected with and synchronized with said drum rotating means, whereby said pellets will be formed in uniform lengths.

References Cited

UNITED STATES PATENTS

| | | | |
|---|---|---|---|
| 963,775 | 7/1910 | Killman | 100—98 X |
| 1,010,175 | 11/1911 | Pooley | 100—98 X |
| 1,102,623 | 7/1914 | Worsey | 107—10 |
| 1,153,103 | 9/1915 | Neale | 100—139 |
| 1,795,012 | 3/1931 | Day | 107—10 |
| 2,207,795 | 7/1940 | Grimm. | |
| 3,063,361 | 11/1962 | Gehrke | 100—139 X |
| 3,191,366 | 6/1965 | Molitorisz | 56—1 |
| 3,244,088 | 4/1966 | Bushmeyer et al. | 100—89 |
| 3,316,694 | 5/1967 | McColly et al. | 100—89 X |
| 3,323,445 | 6/1967 | Bushmeyer et al. | 100—86 |

FOREIGN PATENTS

| | | |
|---|---|---|
| 378,423 | 7/1923 | Germany. |
| 566,820 | 12/1932 | Germany. |

BILLY J. WILHITE, *Primary Examiner.*